(12) United States Patent
Mazzara, Jr. et al.

(10) Patent No.: US 8,543,170 B2
(45) Date of Patent: Sep. 24, 2013

(54) METHOD AND SYSTEM FOR TELEMATICS SERVICES REDIRECT

(75) Inventors: William E. Mazzara, Jr., Drayton Plains, MI (US); Michael J. Peterson, Farmington Hills, MI (US); Dwayne A. Crocker, Oxford, MI (US); Michael Maten, Troy, MI (US)

(73) Assignee: General Motors LLC, Detroit, MI (US)

( * ) Notice: Subject to any disclaimer, the term of this patent is extended or adjusted under 35 U.S.C. 154(b) by 1895 days.

(21) Appl. No.: 10/940,531

(22) Filed: Sep. 14, 2004

(65) Prior Publication Data

US 2006/0058040 A1   Mar. 16, 2006

(51) Int. Cl.
*H04M 1/00* (2006.01)
(52) U.S. Cl.
USPC .......... 455/569.2; 455/569.1; 455/556.1; 455/3.01; 455/238.1
(58) Field of Classification Search
USPC .......... 455/456.3, 456.2, 457, 414.2, 569.2, 455/569.1, 556, 3.1, 238.1; 701/33, 29, 469, 701/23; 379/38, 45; 340/995.24
See application file for complete search history.

(56) References Cited

U.S. PATENT DOCUMENTS

| | | | | |
|---|---|---|---|---|
| 6,535,743 | B1 * | 3/2003 | Kennedy et al. | 455/456.1 |
| 6,832,140 | B2 * | 12/2004 | Fan et al. | 701/33 |
| 6,983,203 | B1 * | 1/2006 | Wako | 701/208 |
| 2002/0193925 | A1 * | 12/2002 | Funkhouser et al. | 701/33 |
| 2003/0216145 | A1 * | 11/2003 | Cox et al. | 455/456.1 |
| 2004/0158371 | A1 * | 8/2004 | Iggulden et al. | 701/29 |

\* cited by examiner

*Primary Examiner* — Kiet Doan
*Assistant Examiner* — Dung Lam

(57) ABSTRACT

The present invention provides a method of operating a telematics device within a mobile vehicle communication system. The method includes receiving a request to initiate communication and identifying a request type based on the received request. The method further includes associating the identified request type with at least one service type within a service type table, wherein the service type table maps one or more request types to a corresponding service type within the service type table. The method additionally includes determining a service type number based on the corresponding service type. The method may further include providing the determined service type number and out-pulsing the provided service type number. The method may additionally include determining the identified request type does not map to the corresponding service type and out-pulsing the received request to initiate communication.

14 Claims, 5 Drawing Sheets

METHOD AND SYSTEM FOR TELEMATICS SERVICES REDIRECT

FIELD OF THE INVENTION

This invention relates generally to wireless communications. More specifically, the invention relates to a method and system for redirecting telematics services within a mobile vehicle communication system.

BACKGROUND OF THE INVENTION

Cellular transceivers operate within communication systems, for example a telematics unit within a mobile vehicle operating within a mobile vehicle communication system (MVCS). Conventional MVCSs heretofore have operated hardware-based prepaid calling systems that offer personal calls while not charging for system calls. Typically, the hardware has no means by which to identify and charge an appropriate fee for services such as directory assistance that are typically charged at a premium rate in other communication systems. Not charging for the use of fee-based services impacts system-wide profit as the MVCS service provider must either provide the service or pay a third party to provide the service.

The present invention advances the state of the art in cellular transceivers.

SUMMARY OF THE INVENTION

One aspect of the invention includes a method of operating a telematics device within a mobile vehicle communication system. The method includes receiving a request to initiate communication and identifying a request type based on the received request. The method further includes associating the identified request type with at least one service type within a service type table and mapping one or more request types to a corresponding service type within the service type table. The method additionally includes determining a service type number based on the corresponding service type.

In accordance with another aspect of the invention, a computer readable medium storing a computer program includes the following: computer readable code for providing a received request to initiate communication; computer readable code for identifying a request type based on the received request; computer readable code for associating the identified request type with at least one service type within a service type table and mapping one or more request types to a corresponding service type within the service type table; and computer readable code for determining a service type number based on the corresponding service type.

Yet another aspect in accordance with the present invention is a system for operating a telematics device within a mobile vehicle communication system. The system includes means for receiving a request to initiate communication. The system further includes means for identifying a request type based on the received request. Means for associating the identified request type with at least one service type within a service type table and mapping one or more request types to a corresponding service type within the service type table is provided. Means for determining a service type number based on the corresponding service type is also provided.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
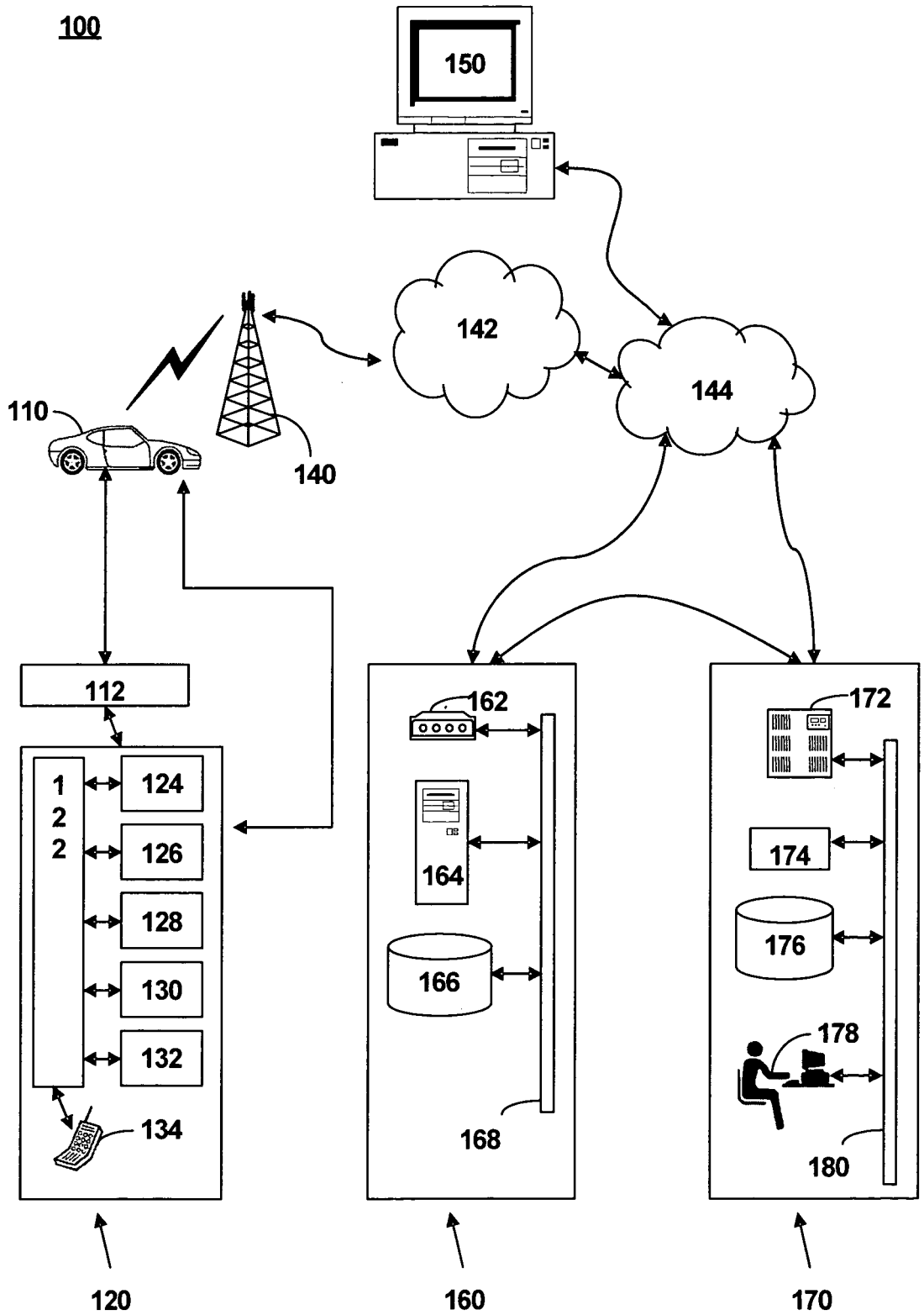
FIG. 1 illustrates an operating environment for implementing wireless communication within a mobile vehicle communication system, in accordance with the present invention.

FIG. 1 illustrates one embodiment of a system for data transmission over a wireless communication system, in accordance with the present invention at 100. System 100 includes a mobile vehicle communication unit (MVCU) 110, a vehicle communication network 112, a telematics unit 120, one or more wireless carrier systems 140, one or more communication networks 142, one or more land networks 144, one or more client, personal, or user computers 150, one or more web-hosting portals 160, and one or more call centers 170. System 100 may include additional components not relevant to the present discussion.

In one embodiment, MVCU 110 is implemented as a mobile vehicle equipped with suitable hardware and software for transmitting and receiving voice and data communications. Therefore, MVCU 110 is also referred to as a mobile vehicle in the discussion below. In operation, MVCU 110 may be implemented as a motor vehicle, a marine vehicle, or an aircraft. Additionally, to practice the present invention in its simplest form, MVCU 110 can be implemented as a conventional cellular transceiver such as, for example, a cellular telephone. MVCU 110 may include additional components not relevant to the present discussion.

MVCU 110, via a vehicle communication network 112, sends signals to various units of equipment and systems within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, for example speakers 132. Telematics unit 120 may include additional components not relevant to the present discussion.

In one embodiment, processor 122 is implemented as a microcontroller, controller, host processor, a digital signal processor (DSP), or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals.

Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication.

GPS unit 126 provides longitude and latitude coordinates, as well as a time stamp, of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Client computer 150 sends user preferences to web-hosting portal 160 through a web-page interface using communication standards such as hypertext transport protocol (HTTP), and transport-control protocol and Internet protocol (TCP/IP). In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from client computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including communicating data over a voice channel of a wireless communication system utilizing frame gaps, carrying out an initial data link authentication process, enrollment services, navigation assistance, directory assistance, roadside assistance, business or residential assistance, information services assistance, emergency assistance, and communications assistance.

Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, telematics unit 120, within MVCU 110, routes outgoing calls to call center 170 as requested via a user interface associated with telematics unit 120, such as, for example a voice command request to initiate communication or a dialing command request to initiate communication. In one embodiment and described in FIGS. 2-4 below, an outgoing call is routed from telematics unit 120 to a determined service type number associated with MVCS 100 based on a request to initiate communication, a request type associated with the initiation request, and availability of the request type.

In another embodiment, if the request type associated with the initiation request is not available, the outgoing call is completed as originally requested.

Figure 2:
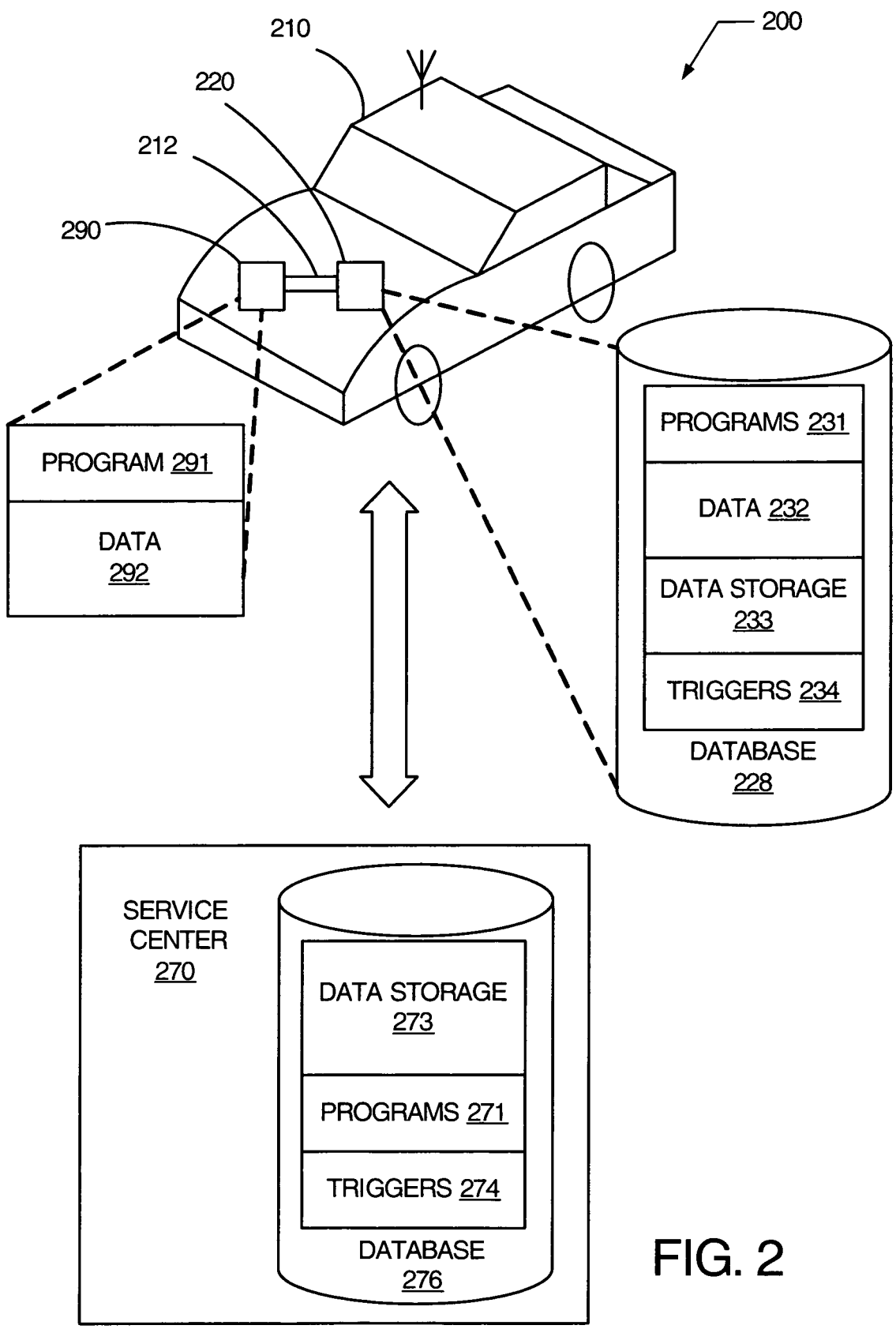
FIG. 2 is a block diagram of a telematics-based system, in accordance with the present invention.

FIG. 2 is a block diagram of a telematics-based system in accordance with an embodiment of the present invention. FIG. 2 shows a telematics-based system 200 for redirecting telematics services utilizing a telematics unit within a telematics-equipped mobile vehicle that is within a mobile vehicle communication system.

In FIG. 2, the system includes a mobile vehicle 210 having a telematics unit 220 coupled to one or more vehicle system modules 290 via a vehicle communication network 212 and to a service provider 270 such as, for example, a call center, a service center, and the like. Telematics unit 220 further includes a database 228 that contains programs 231, data 232, data storage 233, and triggers 234. Vehicle system module (VSM) 290 further includes a program 291 and data 292. Service provider 270 further includes a database 276 that contains programs 271, data storage 273, and triggers 274. In FIG. 2, the elements are presented for illustrative purposes and are not intended to be limiting. Telematics-based system 200 may include additional components not relevant to the present discussion.

Telematics unit 220 is any telematics device enabled for operation with a telematics service provider, for example, telematics unit 120 as described with reference to FIG. 1. Telematics unit 220 in vehicle 210 is in communication with service provider 270 (e.g., a "service center"). Telematics unit 220 includes volatile and non-volatile memory components for storing data and programs. In one embodiment, memory components in telematics unit 220 contain database 228.

Database 228 includes one or more programs 231 for operating telematics unit 220, for example for redirecting telematics services within a mobile vehicle communication system utilizing a telematics unit. In operation, program 231 receives a request to initiate communication via telematics unit 220 at triggers 274. Program 231 identifies a request type based on the received request. Program 231 then compares the identified request type to at least one service type table (described in FIG. 3, below) located within data storage 233. In an example, the service type tables located within data storage 233 are implemented as one or more automatic call rerouting tables (ACRRTs), as is known in the art. The service type table maps the request type to a corresponding service type and determines a service type number, i.e., a phone number.

Vehicle system module (VSM) 290 is any vehicle system control module having software and hardware components for operating, controlling or monitoring one or more vehicle systems. In one embodiment, VSM 290 is a user interface such as in-vehicle mobile phone 134 of FIG. 1 above that provides a voice command request to initiate communication or a dialing command request to initiate communication. In another embodiment, VSM 290 is a global positioning system (GPS) module, for example GPS unit 126 of FIG. 1, and provides location information to complement one or more automatic call rerouting tables (ACRRTs) within data storage 233.

Vehicle system module 290 contains one or more processors, one or more memory devices, and one or more connection ports. In one embodiment, VSM 290 includes a software switch for scanning received information, for example GPS information, to identify that data has been received. VSM 290 is coupled to a vehicle communication network 212 and, therefore, to any other device that is coupled to vehicle communication network 212. In one embodiment, VSM 290 is directly coupled to telematics unit 220, for example, vehicle communication network 212 coupling telematics unit 220 to vehicle system modules 290. In an example, vehicle communication network 212 is a vehicle communication network 112 as described in FIG. 1, above. In another embodiment, VSM 290 is indirectly coupled to telematics unit 220.

Service provider 270 is any service center providing telematics services, for example service center 170 described with reference to FIG. 1. In one embodiment, service provider 270 is enabled to concatenate and otherwise manage database 276 and includes hardware and software for managing database 276 as one or more master automatic call rerouting tables (master ACRRTs). In another embodiment, service center 270 is configured to access a database that is in another location but coupled to service center 270 such as, for example, database 166 in web server 160 as described in FIG. 1. Database 276 contains one or more master ACRRTs stored at data storage 273 and trigger event data stored at triggers 274. In one embodiment, database 276 includes one or more programs 231 for managing one or more master ACRRTs by, for example, updating the one or more master ACRRTs and then providing the updated master ACRRTs to a telematics-based system 200 such as MVCS 100 of FIG. 1 above. In an example, trigger event data specifying conditions for providing updated master ACRRTs is located in triggers 274.

Figure 3:
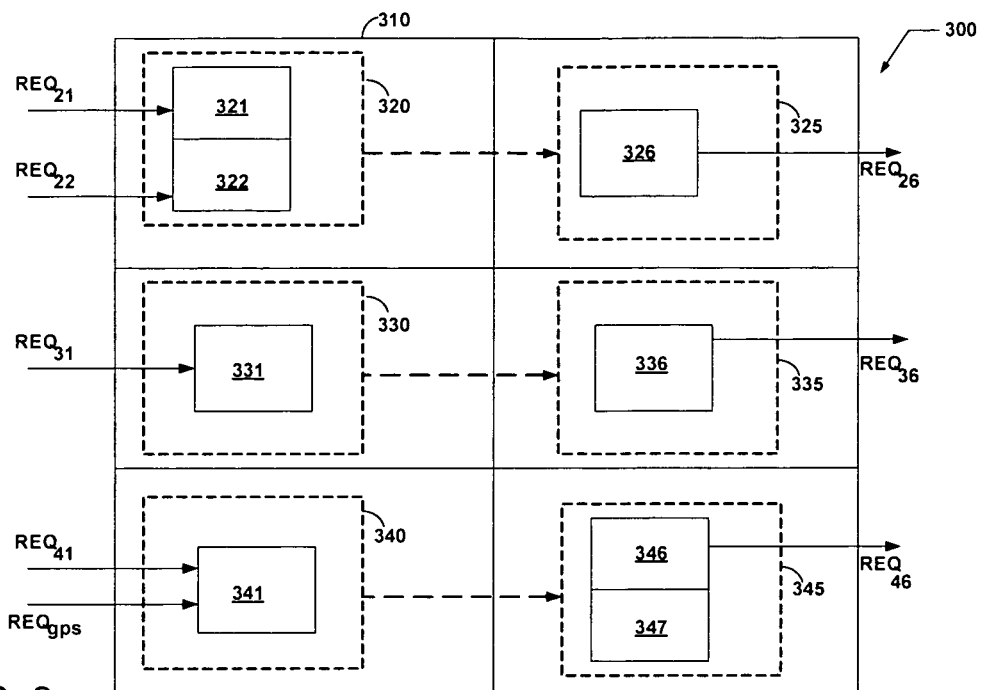
FIG. 3 is a block diagram of multiple embodiments of a call routing table, in accordance with the present invention.

FIG. 3 is a block diagram of multiple embodiments of a call routing table in accordance with the present invention. FIG. 3 shows a call routing table 300 for determining a service type number based on a corresponding request to initiate communication.

Although call routing table 300 includes one or more service type tables, a single service type table 310 is illustrated and described herein for simplicity. Service type table 310 includes request types (320, 330, and 340); corresponding service types (325, 335, and 345); requests to initiate communication ($REQ_{21}$, $REQ_{22}$, $REQ_{31}$, $REQ_{41}$, and $REQ_{gps}$); and service type number requests ($REQ_{26}$, $REQ_{36}$, $REQ_{46}$). Request type 320 further includes request types 321 and 322. Request type 330 further includes request type 331. Request type 340 further includes request type 341. Corresponding service type 325 further includes service type number 326. Corresponding service type 335 further includes service type number 336. Corresponding service type 345 further includes service type numbers 346 and 347. In FIG. 3, the elements are presented for illustrative purposes and are not intended to be limiting. Call routing table 300 may include additional components not relevant to the present discussion.

Service type table 310 is a table stored in a memory device, for example data storage 233 that is within database 228 of FIG. 2. Service type table 310 provides automatic call rerouting. Service type table 310 maps one or more request types with one or service type numbers.

Service types 320, 330, and 340 are general service types such as, for example, information assistance, dealership assistance, and the like that include one or more associated requests for a specific service. For example, service types include promotional response requests such as a radio call in or other actions in response to a promotional message. Request types 321, 322, 331, and 341 are requests for a specific service such as, for example a request for information (411), a request for directory assistance (555-1212), a request to communicate with a prearranged dealership such as the user's home dealership, a request to speak with the geographically closest dealership, and the like.

Corresponding service types 325, 335, and 345 are services provided by a service provider such as, for example, call center 170 that is within MVCS 100 of FIG. 1. Service type numbers 326, 336, 346 and 347 are specific service numbers associated with the MVCS and corresponding to a respective request for a specific service.

Requests to initiate communication $REQ_{21}$, $REQ_{22}$, $REQ_{31}$, $REQ_{41}$, and $REQ_{gps}$ are user-interface-provided commands such as a voice command request or a dialing command request for a specific service, for example, an information communication request, a dealership communication request, and the like. Service type number requests $REQ_{26}$, $REQ_{36}$, $REQ_{46}$ are requests for service that provide specific service type numbers to a telematics device, for example for out-pulsing to complete the interface-provided commands.

In an example, requests to initiate communication $REQ_{21}$, $REQ_{22}$ represent a request for information (411) and a request for directory assistance (555-1212), respectively. The requests to initiate communication $REQ_{21}$, $REQ_{22}$ are identified as request types 321 and 322, respectively, and associated with service type 320. In this example, request types 321 and 322 were previously determined to be of the same service type. Service type table 310 then maps service type 320 to corresponding service type 325. Service type number 326 is then determined based on corresponding service type 325. Service type number requests $REQ_{26}$ including the service type number are then provided. In an example, the service type number is a specific phone number that is provided for out-pulsing by the telematics device.

In another example, a request to initiate communication $REQ_{31}$ represents a request for communication with a prearranged dealer, for example an automotive dealership local to the user's home or office specifically handling warranty situations for the mobile vehicle to which the telematics unit is coupled, for example mobile vehicle 210 of FIG. 2 having a telematics unit 220. Request to initiate communication $REQ_{31}$ is identified as request type 331 and associated with a service type 330. Service type table 310 then maps service type 330 to corresponding service type 335. Service type number 336 is then determined based on corresponding service type 335. Service type number requests $REQ_{36}$ including the service type number are then provided for out-pulsing, for example.

In one embodiment, the request to initiate communication $REQ_{31}$ represents a standard voice or dialing command from a user interface. In this embodiment, request to initiate communication $REQ_{31}$ is identified as request type 331, for example a specified request having a corresponding toll-free MCVS available number, and associated with a service type 330. Service type table 310 then maps service type 330 to corresponding service type 335. Service type number 336 is then determined based on corresponding service type 335. Service type number requests $REQ_{36}$ including the service type number are then provided, for example for out-pulsing. In another embodiment, the request to initiate communication $REQ_{31}$ represents a request for communication with a prearranged dealer utilizing a toll-free number.

In yet another example, request to initiate communication $REQ_{41}$ represents a request for communication with a dealer, for example an automotive dealership within a specified geographic area. In this example, request to initiate communication $REQ_{gps}$ represents GPS information necessary to execute request to initiate communication $REQ_{41}$. The requests to initiate communication $REQ_4$, and $REQ_{gps}$ are identified as request type 341 and associated with a service type 340. Service type table 310 then maps service type 340 to corresponding service type 345. Service type number 346 is then determined from a group of service type numbers 346 and 347 based on the corresponding service type. Service type number requests REQ$_{46}$ including the service type number are then provided for out-pulsing, for example.

Figure 4:
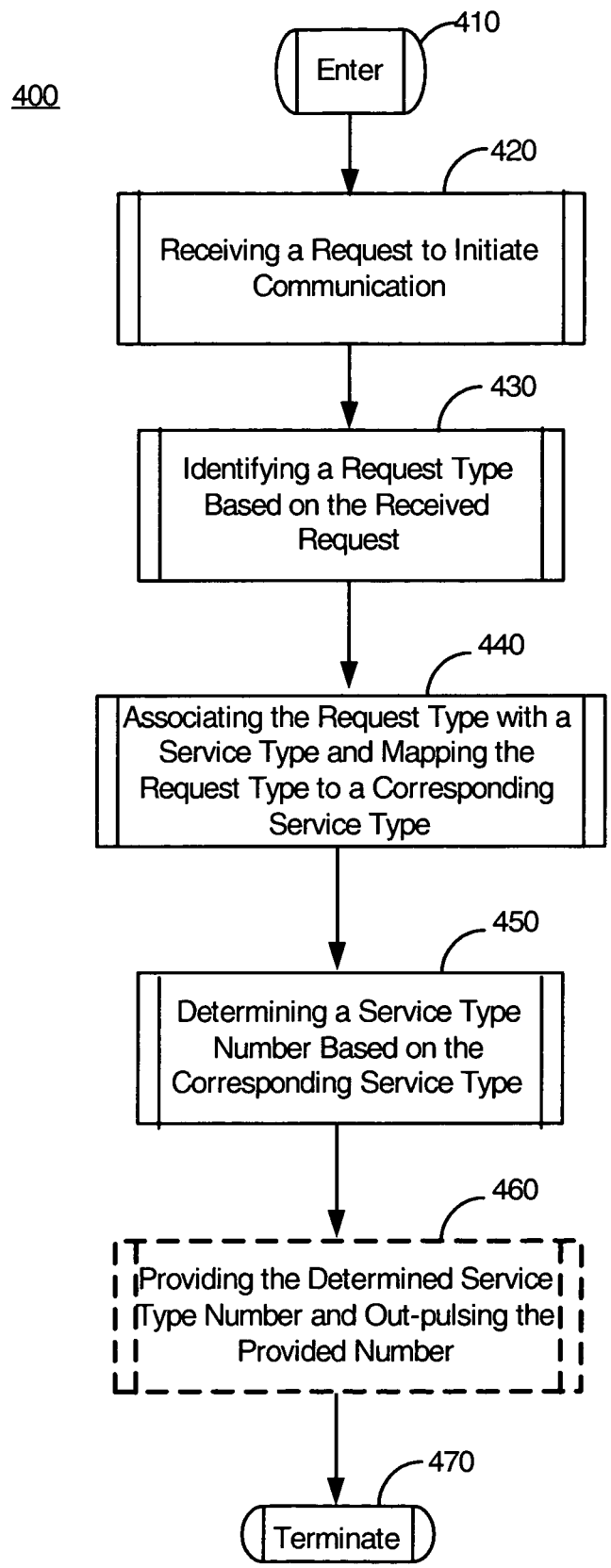
FIG. 4 is a flow diagram of one embodiment of a method of redirecting telematics services within a mobile vehicle communication system, in accordance with the present invention.

FIG. 4 is a flow diagram of one embodiment of a method of redirecting telematics services within a mobile vehicle communication system. In FIG. 4, method 400 may utilize one or more systems and concepts detailed in FIGS. 1-3, above. The program stored in the computer usable medium includes computer program code for executing the method steps described in FIG. 4. In FIG. 4, method 400 begins at step 410.

At step 420, a request to initiate communication is received. Examples of requests to initiate communication include a prearranged dealership dialing request, a dealership proximate the mobile vehicle dialing request, an information dialing request, a directory assistance dialing request, and the like. For example, service types include promotional response requests such as a radio call in or other actions in response to a promotional message.

At step 430, a request type is identified based on the received request.

At step 440, the identified request type is associated with at least one service type within a service type table. Examples of service types include an information assistance dialing request, a dealership assistance dialing request, and the like. The service type table maps the request type to a corresponding service type within the service type table. In one embodiment, the service type table includes toll-free number references. In this embodiment, a request to initiate communication with a prearranged dealership includes a request type that is mapped to a service type. In an example, the request to initiate communication with a prearranged dealership includes a request type that is mapped to a service type including toll-free number references. In another embodiment, the service type table includes GPS location references. In this embodiment, a request to initiate communication with a dealership proximate the mobile vehicle includes a request type that is mapped to a service type. In an example, the request to initiate communication with a dealership proximate the mobile vehicle includes a request type that is mapped to a service type including GPS location references.

At step 450, a service type number is determined based on the corresponding service type. Examples of service type numbers include a directory information number, a specific dealership number such as a prearranged dealership number or a geographically proximate dealership number, and the like.

At optional step 460, the determined service type number is provided and the provided service type number is out-pulsed.

At step 470, the method is terminated.

Figure 5:
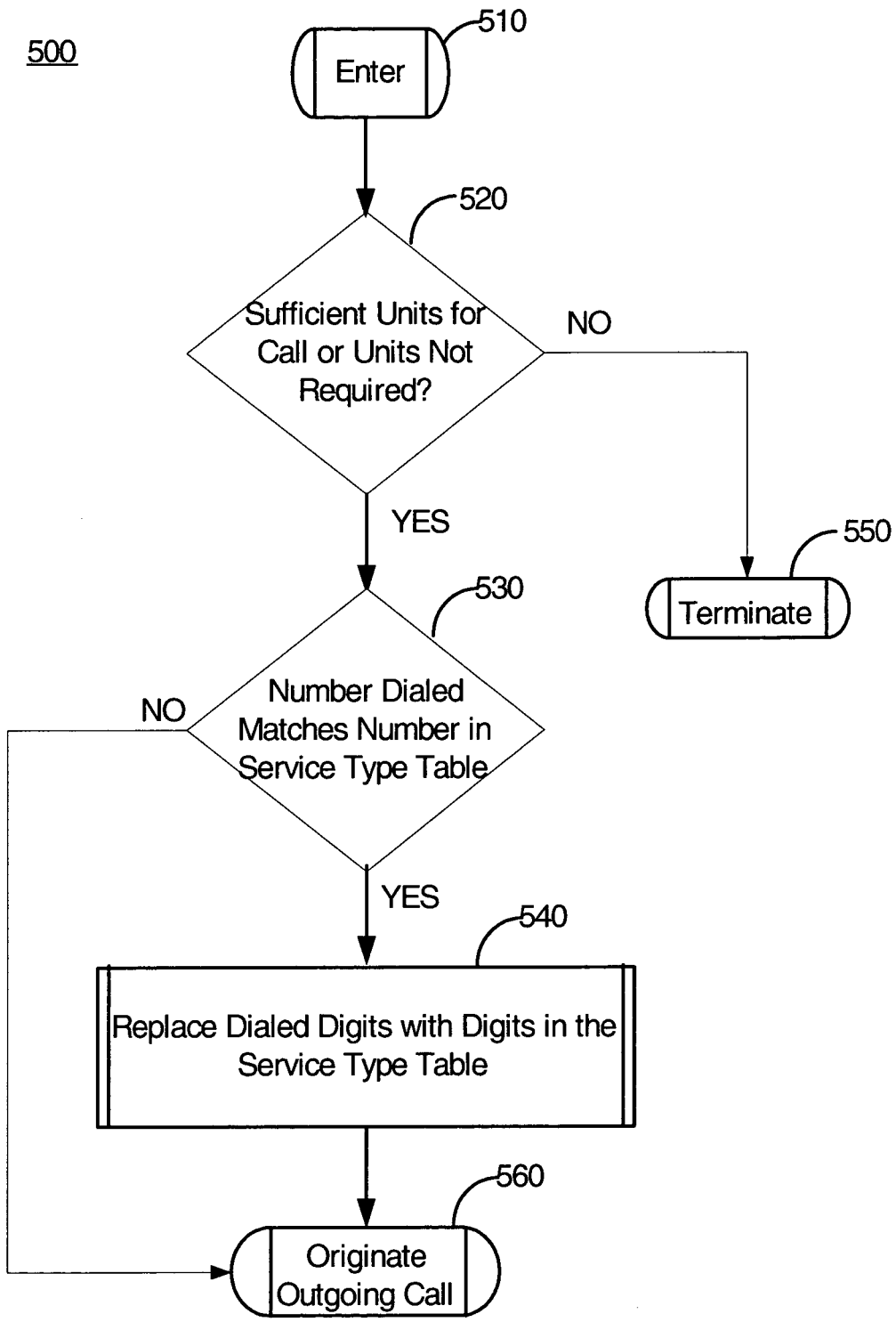
FIG. 5 is a flow diagram of another embodiment of a method of redirecting telematics services within a mobile vehicle communication system, in accordance with the present invention.

FIG. 5 is a flow diagram of another embodiment of a method of redirecting telematics services within a mobile vehicle communication system. In FIG. 5, method 500 utilizes one or more systems and concepts detailed in FIGS. 1-3, above. The program stored in the computer usable medium includes computer program code for executing the method steps described in FIG. 5. In FIG. 5, method 500 begins at block 510.

At decision block 520, a determination is made as to whether sufficient time/billing units are available for a request to initiate communication or whether time/billing units are not required to initiate communication. In one embodiment, determination whether sufficient time/billing units are available for a request to initiate communication or whether time/billing units are not required to initiate communication is implemented utilizing commercially available techniques known to those having ordinary skill in the art. If the determination as to whether sufficient time/billing units are available for a request to initiate communication or whether time/billing units are not required to initiate communication is affirmative, method 500 advances to decision block 530. If the determination as to whether sufficient time/billing units are available for a request to initiate communication or whether time/billing units are not required to initiate communication is negative, method 500 advances to block 550, and the method terminates.

At decision block 530, a determination is made as to whether the number dialed or requested matches a number in a service table type. In one embodiment, the determination as to whether the number dialed or requested matches a number in a service table type is implemented as described in steps 430 and 440 of FIG. 4, above. If the determination as to whether the number dialed or requested matches a number in a service table type is affirmative, method 500 advances to block 540. At block 540, the dialed/requested digits are replaced with digits from the service type table. In one embodiment, the replacement of the dialed/requested digits with digits from the service type table is implemented as described in step 440 of FIG. 4, above. If the determination as to whether the number dialed or requested matches a number in a service table type is negative, method 500 advances directly to block 560.

At block 560, the outgoing call is originated.

The above-described methods and implementation for redirecting telematics services within a mobile vehicle communication system are example methods and implementations and are to be considered in all respects only as illustrative and not restrictive. These methods and implementations illustrate one possible approach for redirecting telematics services within a mobile vehicle communication system. The present invention may be embodied in other specific forms without departing from its spirit or essential characteristics. The actual implementation may vary from the method discussed. Moreover, various other improvements and modifications to this invention may occur to those skilled in the art, and those improvements and modifications will fall within the scope of this invention as set forth in the claims.

What is claimed is:

1. A method of operating a telematics device within a mobile vehicle communication system associated with a mobile vehicle, comprising:
   receiving at the telematics device requests to initiate communication;
   identifying a request type for each received request at the telematics device;
   determining whether an identified request type corresponds to a service type within a service type table, wherein the service type table includes a mapping of one or more request types to one or more corresponding service types within the service type table;
   in response to determining an identified request type of a received request corresponds to a service type within the service type table, determining at the telematics device a service type number associated with the corresponding service type and out-pulsing the service type number; and
   in response to determining an identified request type of a received request does not correspond to a service type within the service type table, out-pulsing the received request to initiate the communication;
   wherein the service type number associated with the corresponding service type is stored in the service type table and is updated prior to the determining the service type number at the telematics device.

2. The method of claim 1, wherein the at least one service type table further includes one or more toll-free number references.

3. The method of claim 2, wherein the request is a request to initiate communication with a prearranged dealership and includes a request type that is mapped in the service type table to a service type including one or more toll-free number references.

4. The method of claim 1, wherein the at least one service type table further includes at least one GPS location reference.

5. The method of claim 4, wherein the request is a request to initiate communication with a dealership proximate the mobile vehicle and includes a request type that is mapped in the service type table to a service type based on a GPS location reference of the mobile vehicle and the at least one GPS location reference in the service type table.

6. The method of claim 1, wherein the request to initiate communication is selected from the group consisting of: an information dialing request, a dealership dialing request, a toll-free dialing request, a promotional response request, a dealership proximate the mobile vehicle dialing request, and a directory assistance dialing request.

7. The method of claim 1, wherein the associated service; type is selected from the group consisting of: an information assistance dialing request, a promotional response request, and a dealership assistance dialing request.

8. A non-transitory computer readable medium for use in a telematics unit, the computer readable medium storing a computer program comprising computer readable code for:
 receiving at the telematics device requests to initiate communication;
 identifying a request type for each received request at the telematics device;
 determining whether an identified request type corresponds to a service type within a service type table, wherein the service type table includes a mapping of one or more request types to one or more corresponding service types within the service type table;
 in response to determining an identified request type of a received request corresponds to a service type within the service type table, determining at the telematics device a service type number associated with the corresponding service type and out-pulsing the service type number; and
 in response to determining an identified request type of a received request does not correspond to a service type within the service type table, out-pulsing the received request to initiate the communication;
 wherein the service type number associated with the corresponding service type is stored in the service type table and is updated prior to the determining the service type number at the telematics device.

9. The computer readable medium of claim 8, wherein the service type table further includes one or more toll-free number references.

10. The computer readable medium of claim 9, wherein the received request is a request to initiate communication with a prearranged dealership and wherein the request type is mapped to a service type including one or more toll-free number references.

11. The computer readable medium of claim 10, wherein the service type table further includes one or more GPS location references.

12. The computer readable medium of claim 11, wherein the request type is mapped to a service type based at least in part on a GPS location reference of the mobile vehicle and the one or more GPS location references.

13. The computer readable medium of claim 8, wherein the request to initiate communication is selected from the group consisting of: an information assistance dialing request, a promotional response request, and a dealership assistance dialing request.

14. The computer readable medium of claim 8, wherein the service type number is selected from the group consisting of: an information assistance number, a promotional response number, and a dealership assistance number.

* * * * *